United States Patent [19]

Kimball

[11] Patent Number: 5,059,126

[45] Date of Patent: Oct. 22, 1991

[54] SOUND ASSOCIATION AND LEARNING SYSTEM

[76] Inventor: Dan V. Kimball, 1560 San Roque Rd., Santa Barbara, Calif. 93105

[21] Appl. No.: 520,765

[22] Filed: May 9, 1990

[51] Int. Cl.$^5$ .............................................. G11B 7/00
[52] U.S. Cl. ..................................... 434/308; 369/97; 434/317; 382/10
[58] Field of Search ............... 434/303, 308, 310, 309, 434/314–319, 311; 382/10; 369/97, 92, 107

[56] References Cited

U.S. PATENT DOCUMENTS

| | | | |
|---|---|---|---|
| 3,744,150 | 7/1973 | Folson | 434/317 |
| 4,124,943 | 11/1978 | Mitchell et al. | 434/307 |
| 4,338,684 | 7/1982 | Dolby | 369/92 |
| 4,375,058 | 2/1983 | Bouma et al. | 382/10 |
| 4,570,250 | 2/1986 | Gabritsos et al. | 369/97 |

*Primary Examiner*—Richard J. Apley
*Assistant Examiner*—Glenn E. Richman
*Attorney, Agent, or Firm*—Donald A. Streck

[57] ABSTRACT

A learning and identification support system for birders and such comprising, a media having a plurality of visually recognizable bird pictures thereon associated with respective ones of a plurality of birds to have birdsong associated therewith. A plurality of scannable barcodes are disposed on the media and associated with respective ones of the bird pictures. Each of the plurality of scannable barcodes comprises a unique index indicating the one of the bird pictures with which it is associated. A barcode scanner is used for scanning individual selected ones of the barcodes to obtain an electrical signal at an output thereof containing the unique index. There is a Compact Disc (CD) containing a plurality of birdsongs associated with respective ones of the plurality of birds, each of the plurality of birdsongs being individually addressable by means of a unique index associated therewith. There is also a CD player for playing the CD to output digital data streams reflecting selected ones of the birdsongs as well as a headset or speaker connected to the Compact Disc player means for reproducing birdsongs from the digital data streams. A data compression technique is employed which permits the system to be used for "talking book" applications with as much as nine hours of playing from a single CD. An interactive audio system configuration of the invention is also shown which can improve language learning and provide an environment for interactive audio adventures.

27 Claims, 4 Drawing Sheets

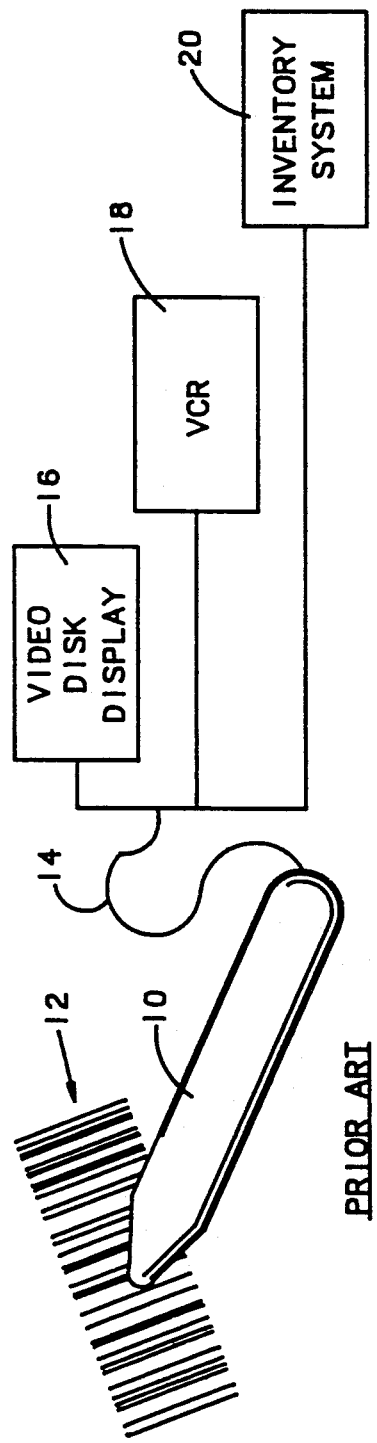
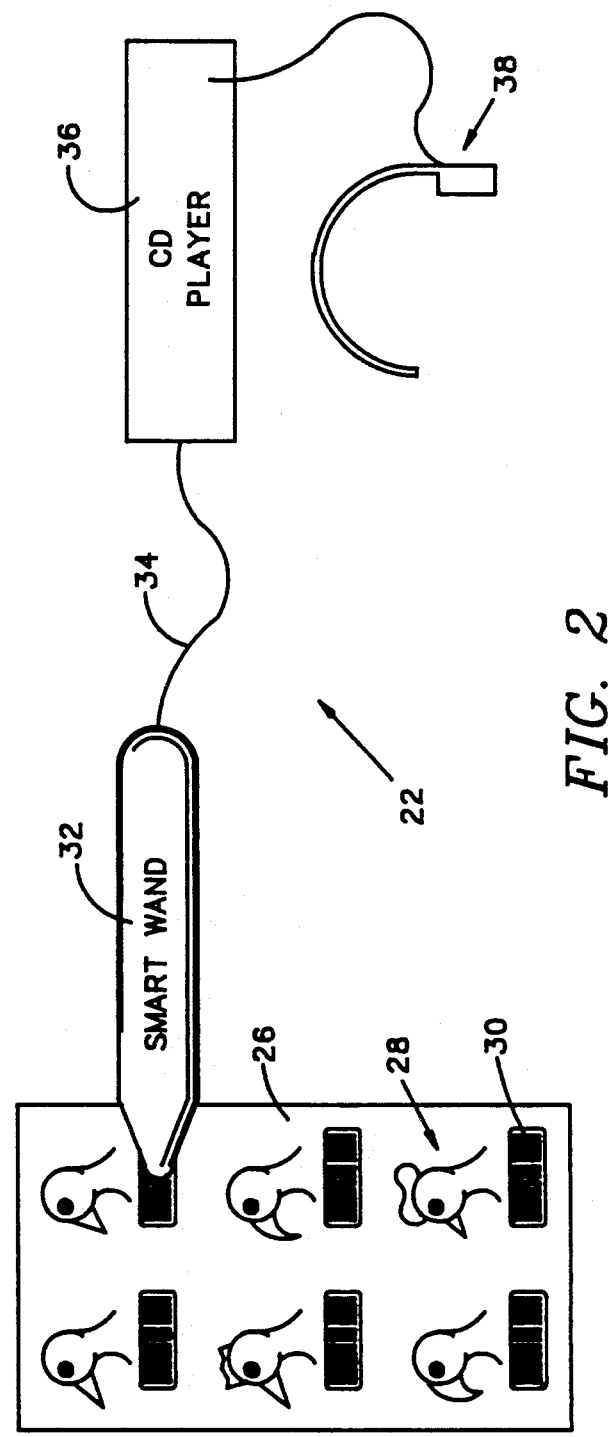

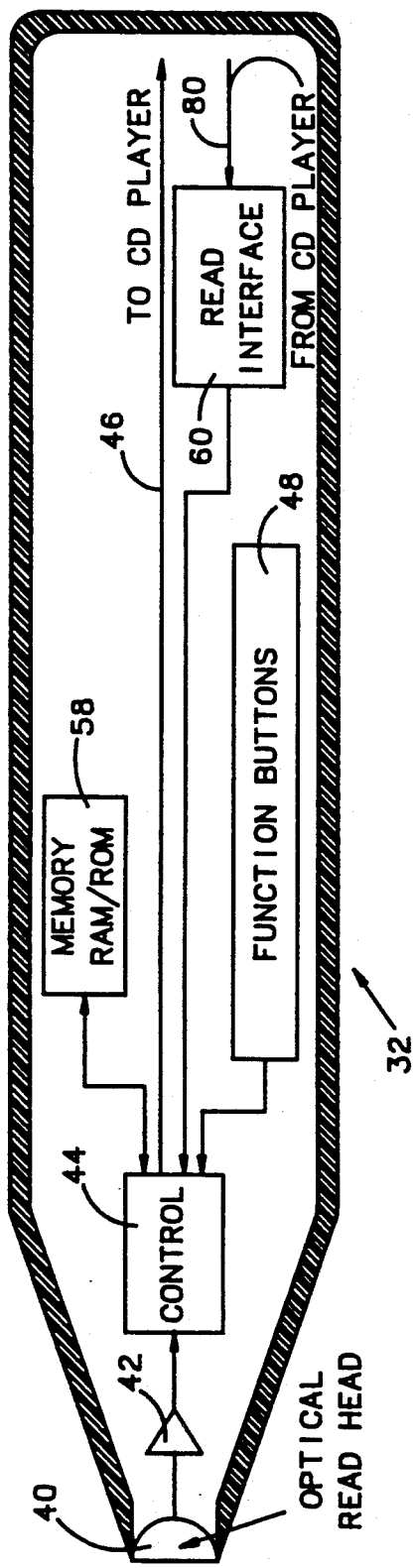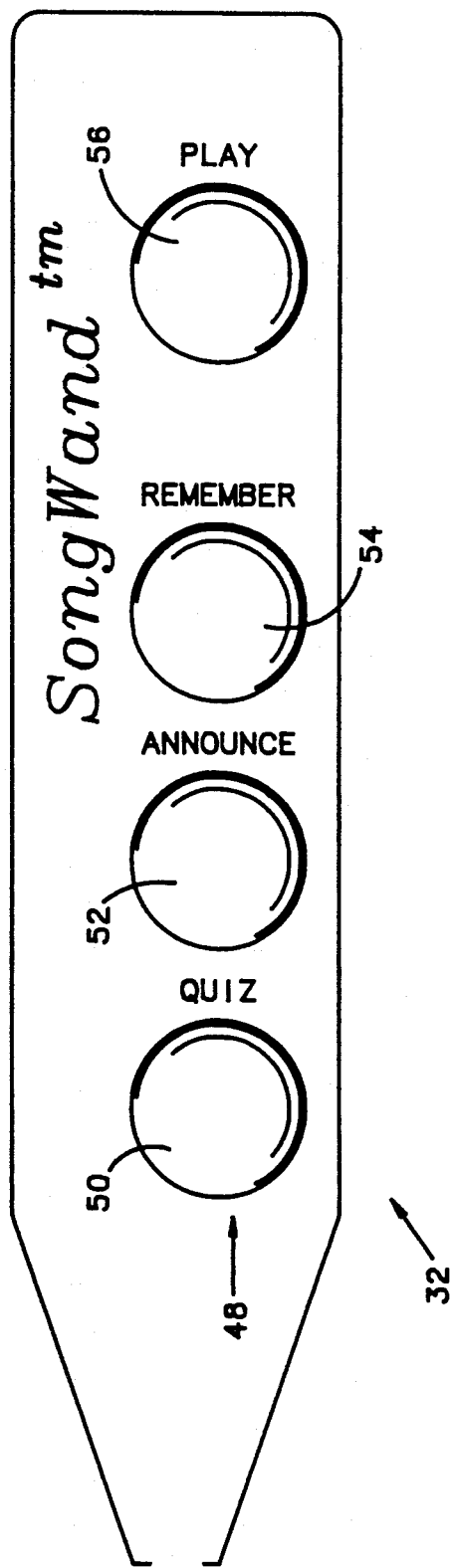

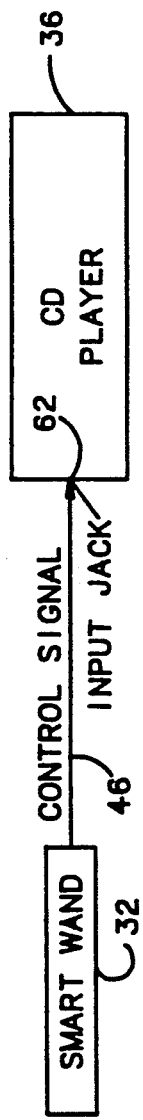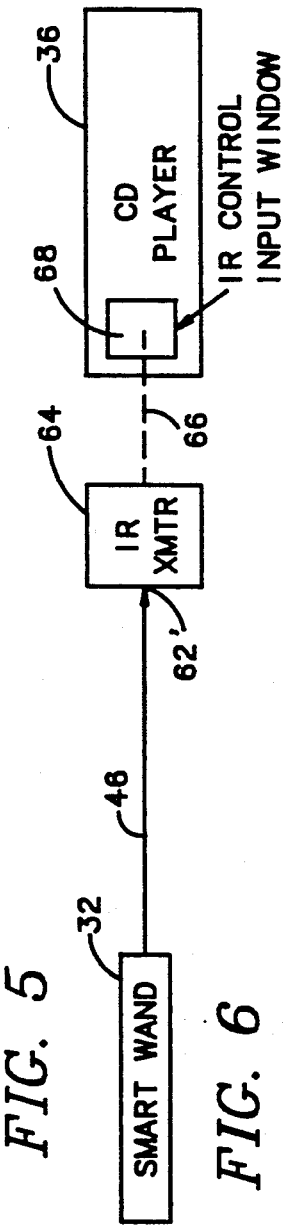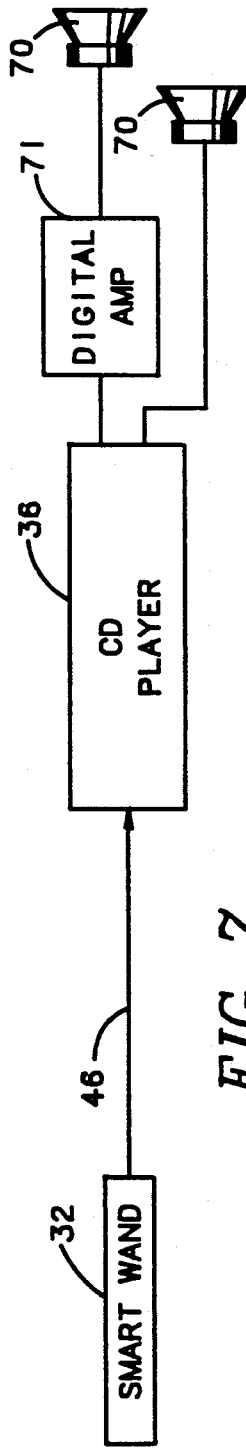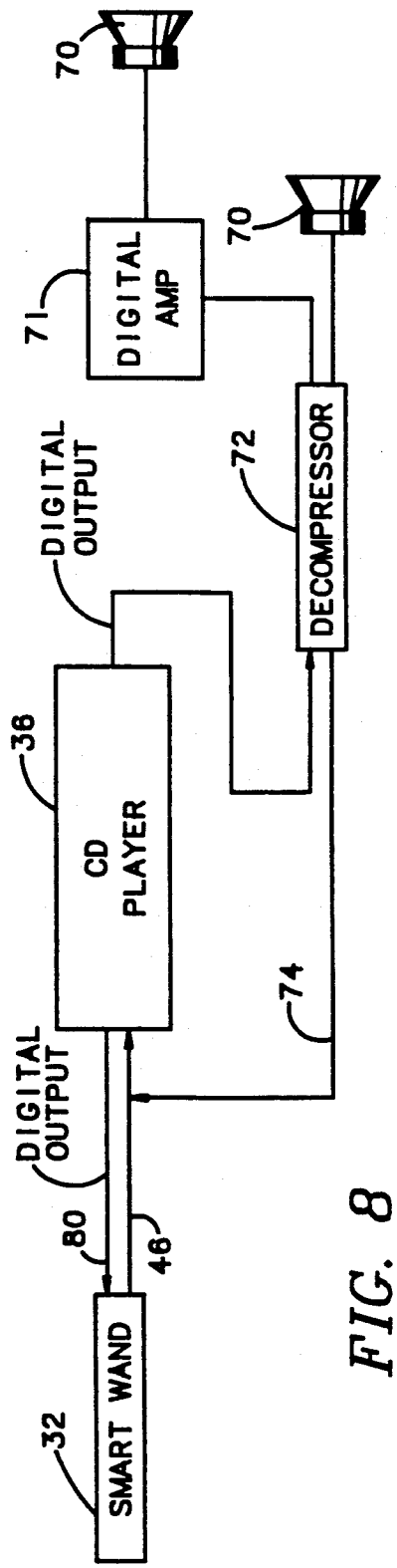

SOUND ASSOCIATION AND LEARNING SYSTEM

BACKGROUND OF THE INVENTION

This invention relates to sound association and learning systems for human and animal languages and, in particular, to a sound association and learning system of the present invention comprising, a media having a plurality of visually recognizable indicia thereon associated with respective ones of a plurality of items to have sounds associated therewith; a plurality of scannable barcodes disposed on the media and associated with respective ones of the indicia, each of the plurality of scannable barcodes comprising a unique index indicating the one of the indicia with which it is associated; scanner means for scanning individual selected ones of the barcodes to obtain an electrical signal at an output thereof containing the unique index; a Compact Disc containing a plurality of sounds associated with respective ones of the plurality of items, each of the plurality of sounds being individually addressable by means of a unique index associated therewith; Compact Disc player means for playing the Compact Disc to output digital data streams reflecting selected ones of the sounds; and, sound reproduction means connected to the Compact Disc player means for reproducing sounds from the digital data streams.

Sound association and learning systems are not new. Even toy companies produce such systems for the very young. For example, a toy pig which when squeezed produces an "oink" sound is, in fact, a type of sound association and learning system. Other "toys" which have sound association and learning capability for small children include a box in which a dial is pointed at the item of interest and a string pulled to cause a brief recording of the sound produced by the item of interest to be played.

Language learning is probably the most important area of interest in this regard. With the advent of microcomputer and logic chips, language learning can be "computerized" on a scale that will literally fit into one's pocket. When in a foreign country, the traveler can simply type in the English word of interest on a miniature keyboard and have the corresponding foreign word displayed on an alphanumeric display in a device which fits into the palm of the hand. There are also products presently on the market that accept voice inputs in one language, translate to a second language, and output the second language equivalent in voice.

There is a vast difference between learning a language through the written word and learning the same language through the spoken word. This is even more true when the language of interest is a non-human language such as birdsong.

There are a number of systems for learning "spoken" language (human or otherwise). A learning environment (formal or informal) with a one-on-one relationship between student and teacher is undoubtedly the best. It is the natural way one learns a language as an infant. Quite often, however, it is not possible or convenient for one to have such a teaching/learning relationship with a native speaker. In such cases, so-called "self-learning" have been employed. In years past, recordings on phonograph records were used extensively. More recently, the audio cassette has replaced the record. Cassettes, of course, can be played in an automobile while driving or can be played by one of the small portable players while biking, walking, jogging, or what have you. For many years (and in many cases still today) such self-learning systems are simply rote systems wherein the English word or phrase is first pronounced by the recording and then the corresponding word or phase is pronounced one or two times followed by a pause during which the student can pronounce it aloud.

Recently, language learning systems have been made available which attempt to make language learning a more pleasant and enjoyable task (and therefore easier in which to maintain an interest). While better than the older systems, they are still held back by the limitations of the cassette recordings that they employ. While random access sound recording devices are available in the recording art, they have not been incorporated into the art of language learning and recognition.

Most recording methods and associated apparatus are also extremely limited in the amount of data which can be put on a single recording medium. This is particularly limiting in portable equipment such as the language translator mentioned above.

Wherefore, it is an object of the present invention to provide a sound recognition and learning system which is easy and enjoyable to use so as to stimulate the learning experience.

It is another object of the present invention to provide a sound recognition and learning system which is particularly useful for the learning of human and non-human languages.

It is still another object of the present invention to provide a sound recognition and learning system useful for human and non-human languages which employs modern technology including random access recording devices.

It is yet another object of the present invention to provide a sound recognition and learning system useful for human and non-human languages which permits extended recording of data on a single recording medium.

Other objects and benefits of the present invention will become apparent from the detailed description which follows hereinafter when taken in conjunction with the drawing figures which accompany it.

Summary

The foregoing objects have been achieved by the sound association and learning system of the present invention comprising, a media having a plurality of visually recognizable indicia thereon associated with respective ones of a plurality of items to have sounds associated therewith; a plurality of scannable barcodes disposed on the media and associated with respective ones of the indicia, each of the plurality of scannable barcodes comprising a unique index indicating the one of the indicia with which it is associated; scanner means for scanning individual selected ones of the barcodes to obtain an electrical signal at an output thereof containing the unique index; a Compact Disc containing a plurality of sounds associated with respective ones of the plurality of items, each of the plurality of sounds being individually addressable by means of a unique index associated therewith; Compact Disc player means for playing the Compact Disc to output digital data streams reflecting selected ones of the sounds; and, sound reproduction means connected to the Compact Disc player means for reproducing sounds from the digital data streams.

The preferred scanner means comprises a hand-held wand having an optical scanner in a scanning end thereof. Additionally, the wand includes memory means for storing a plurality of the barcodes after individual scanning thereof and selector means for manually selecting ones of the barcodes in the memory means for which the associated sound is to be reproduced. Preferably, the selector means comprises a first manually activateable switch and there is logic means for sensing activation of the first manually activateable switch, for accessing the memory means, and for causing the associated the sound to be reproduced. Also preferably, there is a second manually activateable switch and the logic means includes means for sensing the second manually activateable switch and for storing a scanned barcode in a next available position on a list in the memory means when the second manually activateable switch is activated.

To increase the capability of the system, the Compact Disc includes control information thereon; there is read interface means connected to the Compact Disc player means and the memory means for inputting digital control data from the Compact Disc into the memory means; and, the logic means includes reprogramable logic means for executing logic sequences determined by the digital control data whereby the sound association and learning system can be a general system which is specialized by digital control data added to respective ones of a plurality of specialized Compact Discs.

In one version, the sound reproduction means comprises an earphone to be worn by a user of the system. In another version, the sound reproduction means comprises an audio speaker and a digital amplifier connected to drive the audio speaker.

To obtain desired data compression for certain applications, the sounds on the Compact Disc are digitized sounds created by sampling analog sounds at a first sampling rate and then storing them on the Compact Disc as if sampled at a second sampling rate which is faster than the first sampling rate. Further, the sound reproduction means includes, digital buffer means for receiving the digital data streams from the Compact Disc player means and for outputting revised digital data streams to the digital amplifier, and bi-stable clock means connected to the buffer means for inputting the digital data streams at the second sampling rate and for outputting the digital data streams as revised digital data streams at the first sampling rate. There is also accordion store logic means connected to a control input of the Compact Disc player means, to the buffer means and to the bi-stable clock means for pausing input from the Compact Disc player means into the buffer means if the buffer means becomes full. According to one approach, the accordion store logic means first inputs a portion of a the digital data stream into the buffer means, then pauses the Compact Disc player means, then outputs the portion from the buffer means, and then repeats the foregoing process until a full the digital data stream as selected has been output to the digital amplifier. For "talking book" applications and the like, the second sampling rate is about five times faster than the first sampling rate and there are means for artificially adding overtones to each the digital data stream whereby more realistic human speech is recreated from compressed data.

According to one embodiment, the plurality of visually recognizable indicia comprises pictures of animals and the sounds comprise sounds made by respective ones of the animals. The preferred version of this embodiment is for birders wherein the animals are birds and the sounds are birdsong.

According to another embodiment, the plurality of visually recognizable indicia comprises pictures of things and concepts and the sounds comprise verbal sounds corresponding to the things and concepts in a human language. In a more specialized version of this embodiment, the plurality of visually recognizable indicia comprises words describing things and concepts in a first human language and the sounds comprise verbal sounds corresponding to the things and concepts in a second human language. Both these systems are, of course, intended primarily for language translation applications.

DESCRIPTION OF THE DRAWINGS

FIG. 1 is a simplified drawing depicting several prior art systems employing an optical wand for reading bar code to make selective inputs to the system.

FIG. 2 is a simplified drawing of a birdsong identification and learning system according to the present invention.

FIG. 3 is a simplified partial functional block diagram of a preferred SongWand TM barcode reader and control input device which could be employed in the system of FIG. 2.

FIG. 4 is an external view of the SongWand TM of FIG. 3 in a tested embodiment thereof.

FIG. 5 is a simplified functional block diagram showing one way of controlling the CD player according to the present invention.

FIG. 6 is a simplified functional block diagram showing another way of controlling the CD player according to the present invention.

FIG. 7 is a simplified functional block diagram showing one way of getting the sounds from the CD player according to the present invention.

FIG. 8 is a simplified functional block diagram showing another way of getting the sounds from the CD player according to the present invention when the recorded sounds have been compressed.

DESCRIPTION OF THE PREFERRED EMBODIMENT

Figure 9:
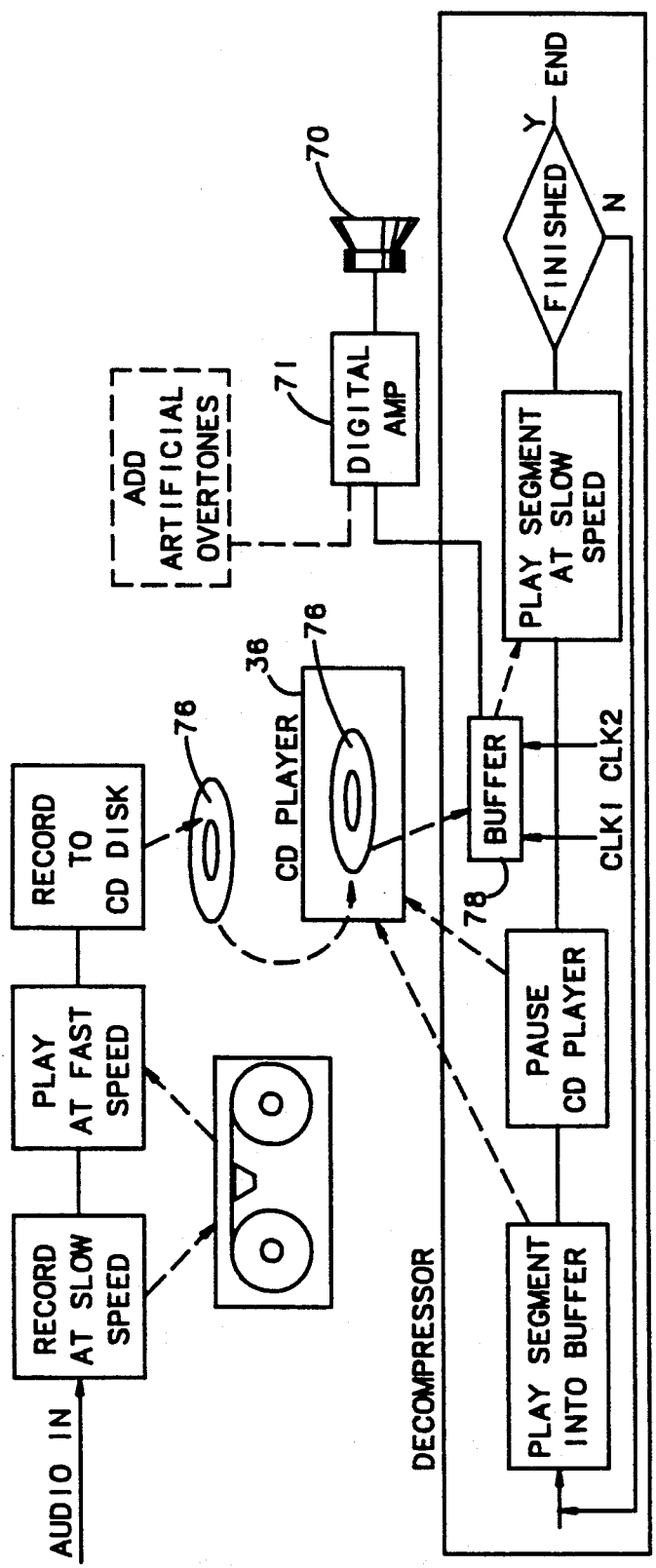
FIG. 9 is a drawing depicting the manner in which the decompressor of the preferred embodiment works.

Before beginning the description of the present invention and its preferred embodiment, it should be pointed out that for convenience only and because the system has been built and tested in this form for introduction in the future as a commercial product, the description which follows hereinafter is directed to a system for learning and identifying the songs of birds (i.e. birdsong). As those skilled in the art will readily recognize and appreciate, the scope and spirit of the invention is much larger than that limited application. Bird pictures and recorded birdsong could be replaced with written English words and spoken Spanish equivalent words to turn the system into a human language learning and/or translation system. The audio compression techniques employed therein could be used to good advantage in so-called "talking book" systems as employed by the visually handicapped, and the like. It is, therefore, the applicant's intent that the claims appended hereto be accorded a breadth in keeping with the scope and spirit of the invention disclosed herein and that they not be limited in any way by the choice of a particular example.

In attempting to provide a system which would meet all the stated objectives, the inventor herein was faced with several aspects of the total system for which improved capability had to be provided. It was first decided that the goals of ease of use and providing of a "fun" environment in which to learn called for an interactive system rather than a start and play device. An interactive system, in turn, called for an easy to use and convenient input device by means of which a user could indicate selections, options, and the like. As a basis upon which to build the desired input device, an optical barcode reader was chosen. Hand-held barcode readers are, of course, well known in the art. As depicted in FIG. 1, the barcode reading wand 10 is scanned across the barcode 12 to create an output signal on line 14 reflecting the digits encoded by the barcode 12. This data can then be employed by a video display system 16 (such as that shown in U.S. Pat. No. 4,481,412 of Fields), a VCR 18 (such as employed by several presently being sold commercially with so-called "on screen" programming), an inventory system 20 (as seen in use in many supermarkets), or the like, to which the line 14 is connected as an input. Their use in conjunction with sound and learning systems is, likewise, not unique as exemplified by U.S. Pat. Nos. 4,466,801 (Dittakavi et al.), 4,549,867 (Dittakavi), 4,505,682 (Thompson), 4,457,719 (Dittakavi et al.), and 4,337,375 (Freeman). As will be appreciated from a review of the above-referenced patents, the barcode reading wands thereof were nothing more than passive devices which (as described above) turn a scanned barcode into an electrical signal representing the encoded data of the barcode. As will be seen from the description hereinafter, the smart wand of the present invention is far from being a passive device.

A Compact Disc (CD) was chosen as the preferred recording medium for several major reasons. First, it is a random access storage device. Second, there are truly portable players therefor such as those made by Sony of Japan. This was an important aspect with respect to a system intended for the field identification of birds. A third consideration is that the Sony CD players provided a control input whereby the functions of the CD player could be controlled. This, of course, was an important consideration relative to an interactive system. As will be seen later herein, it was also important to being able to increase the storage capability of a single CD disc according to the techniques of the present invention and to meet all of the stated objects thereof.

The resultant system is shown in very simplified form in FIG. 2 wherein it is generally indicated as 22. The system 22 includes a book 24 having pages 26 therein by means of which the visual portions of the system are defined. In the implemented version of the present invention intended for birdsong recognition, the book 24 is a published fieldguide for birders. Each page 26 includes a plurality of pictures 28 of birds. Under each picture 28, a a pre-printed barcoded sticker 30 associated with the bird in the picture 28 is affixed. The barcode could, of course, be printed on the page if desired. In this particular implementation it was more expedient to employ one of the fine published birdwatchers' fieldguides that are available. The barcoded stickers 30 are optically scanned by a smartwand 32 in a manner to be described shortly. The smartwand 32 is connected by cable 34 to the CD player 36. The CD player 36 contains a pre-recorded CD disc (not shown in this drawing figure) having the birdsongs thereon according to a pattern which can be randomly accessed from the data contained on the barcode of a scanned sticker 30. The CD player 36 also has an earphone 38 connected thereto which can be placed over a user's ear so as to hear the birdsong played by the CD player 36. For this particular use, it is preferred that only one ear of the user be covered so that the other ear can hear the birdsong of the bird for comparison purposes. For other applications, a dual-speaker headset may be more desirable so as to block out outside distractions; or, one may wish to use the new "open air" headphones which allow you to hear outside noises even with the headphones on. With regard to birding, one may also want to amplify the output from the CD player 36 sufficiently to drive an actual audio speaker so as to attract birds of a particular species by playing their birdsong.

As stated earlier herein, contrary to prior art devices which use a barcode reading wand as a passive device doing nothing more than inputting scanned data to an intelligent device, in the system 22 of the present invention those rolls are reversed. While the preferred CD player 36 may have capabilities over and above those of a standard CD player as will be described later herein, the basic objects of the present invention can be achieved with a standard commercial CD player. As depicted in greater detail in FIGS. 3 and 4, the smart wand 32 of the system 22 (referred to as a Song-Wand ™ in the birdsong identification system of the inventor herein) includes considerable capability over and above simply being able to scan a barcode and produce an electrical signal output reflecting the encoded data which has been scanned. The basic smart wand 32 has an optical read head 40 in the tip for scanning over barcodes. The read head 40 is of any commercial variety available for such purposes and, per se, is not a point of novelty of the present invention. In the usual manner, the electrical output of the read head 40 is connected as an input to an amplifier 42 which raises the electrical signal from the read head 40 to a useable level. Rather than simply being output as in prior art barcode reading wands, however, the output of the amplifier 42 is connected as an input to digital control logic 44. The control logic 44 has an output 46 which is connected to control the CD player 36 in a manner to be discussed shortly. The control logic 44 is also connected to input from the function buttons 48. The function buttons 48 (which in this exemplary embodiment comprise a QUIZ button 50, an ANNOUNCE button 52, a REMEMBER button 54, and a PLAY button 56) control the manner in which the system 22 operates, which will be described in further detail shortly. There is also a memory 58 to which the control logic 44 is connected. In the initial tested embodiment, the memory 58 includes ROM containing the programs which define the logic of the system 22 as well as RAM which holds temporary data associated with the mode of operation of the system 22 presently in progress. Also depicted in FIG. 3 is a read interface 60 which in a preferred and future version of the system 22 will allow the smart wand 32 to secure individualized programming information associated with a CD disc from the disc itself. This too will be discussed in greater detail shortly.

Before describing the various hardware combinations possible within the scope and spirit of the present invention, the use of the smart wand 32 in its birding adaptation will first be described in detail so that the full capability and potential of the system 22 being described can be appreciated. In this version, the pre-recorded birdsongs and the associated directory data on the CD disc are pre-coordinated to the barcodes on the stickers 30. Thus, if the stickers 30 are attached to the pages 26 of the book 24 in association with the proper bird pictures 28, the scanning thereof will result in the location and playing of the proper birdsong for the bird selected. In the current version which is in the process of being implemented for commercial sale, the ROM uses relative addressing and there are three bird discs. The system as being described herein will also work with barcodes that have absolute addresses for future discs such as those which might be used with a human language system. The smart wand 32 as implemented allows the user to employ the function buttons 48 so as to operate the system 22 in various ways. The ANNOUNCE button 52 allows a verbal announcement associated with each birdsong to be turned off and on. In a learning mode, the announcement is turned on. Thus, for example, the user would hear an example of birdsong followed by the description thereof such as "English Sparrow". In an identification mode, the announcement would be turned off. When the user heard what he/she thought was the birdsong of an English Sparrow, for example, the English Sparrow barcode would be scanned and the birdsong played without announcement for comparison purposes.

The REMEMBER button 54 causes the barcodes scanned to be stored in the RAM portion of the memory 58. A delay is built into the control logic 44 so that when the PLAY button 56 is pressed, the CD player 36 is not activated immediately. Thus, the user can depress the PLAY button 56 to indicate the item on the pre-scanned list in memory 58 which is to be played. For example, to play the third item, the PLAY button 56 would be pressed three times in succession. As those skilled in the art will readily appreciate, this feature would be particularly useful in a language translating device according to the present invention. Before going into a restaurant, for example, the traveler could select several items from the "menu" portion of his/her translation book employing the smart wand 32. To retrieve the appropriate foreign word when in the restaurant, the PLAY button 56 need only be depressed the proper number of times. The smart wand 32 could be in the user's pocket out of sight. As can be appreciated, the announce function would probably want to be on so as to verify the selection.

The QUIZ button 50 provides an interesting and entertaining learning mode for the system 22 which would also be useful for human language learning as well. In the quiz mode, several items are scanned into the memory 58 employing the REMEMBER button 54. Each time the QUIZ button 50 is pressed, the control logic 44 randomly selects one of the entries from the list in memory 58. The birdsong of the item is played, and after a delay to allow the user to mentally identify the bird associated with the birdsong, the name is verbally given as when the announce mode is on. As those skilled in the art will readily appreciate, variations could be made on this learning approach if desired. For example, after the items have been scanned into the memory 58 and the birdsong of a random item played, the control logic 44 could wait for the user to scan the barcode of a sticker 30 under the picture 28 of the bird believed to be associated with the birdsong. The control logic 44 could then verify the choice as having been proper or improper. As those skilled in the art will readily recognize and appreciate, user-programmable function buttons could be a beneficial addition that could be added in certain embodiments of the present invention, if desired. Additional functions could also be defined for implementation by the activation of existing function buttons in combination and/or in sequence.

Turning now to FIGS. 5-9, various hardware combinations and features according to the present invention in various embodiments will now be described. FIG. 5 depicts the control arrangement in a preferred embodiment wherein the CD player 36 has an input jack as at 62 into which the output line 46 from the smart wand 32 can be plugged (using an appropriate plug electrically mounted on the end thereof) so as to provide control inputs to the CD player 36. As mentioned earlier, a portable model made by Sony includes this feature. As those familiar with CD players are aware, the typical CD player has buttons on the player itself as well as buttons on a remote device by means of which various functions of the player such as PLAY, PAUSE, SKIP, and STOP can be controlled. By providing the expected signals through the jack 62, the smart wand 32 can control the same functions so as to provide its various features.

FIG. 6 shows how the control of the CD player 36 by the smart wand 32 could be effected where the CD player 36 did not have the control signal input jack 62. Such might be the case where a shelf model CD player was employed to play a talking book CD disc to the visually impaired. In this case, the smart wand 32 is connected to a control input jack 62' of an IR transmitter 64. The IR transmitter 64 receives the control signals from the smart wand 32 and outputs them as the expected signals on an IR beam 66 directed into the IR control input window 68 of the CD player 36.

FIG. 7 depicts the basic way in which the system 22 produces sound playback. The smart wand 32 is connected to control the CD player 36 and the CD player 36 is connected to the speaker 70. As those skilled in the art will appreciate, this is a simplified representation only and the CD player 36 may drive the speaker 70 directly when the speaker 70 is a headphone device requiring low power; or, it may drive a digital amplifier 71 actually driving the speaker 70 when the speaker 70 is of a kind requiring more power. In either case, as depicted whatever is played on the CD disc within the CD player 36 is produced on the "speaker" 70. A preferred approach to producing sound playback according to the present invention so as to extend the amount of information that can be contained on a single CD disc is depicted in FIG. 8. In this case, the smart wand 32 is again connected to control the CD player 36. The output from the CD player 36, however, is connected as an input to a decompressor 72 which, in turn, is connected (directly or through a digital amplifier) to the speaker 70. A control output 74 from the decompressor 72 is also connected to control the CD player 36. The decompressor 72 operates as depicted in FIG. 9. Compact disc recording and playback systems were developed primarily as high fidelity music systems. The data on a CD disc is in digital form. Thus, at the time of recording the analog sound signal is transformed into digital data by an analog-to-digital (A-D) converter. As those skilled in the art know, an A-D converter samples the incoming analog signal at spaced intervals to create the digital representation thereof. The faster the A-D converter samples the incoming analog signal (i.e. the closer the sample points are together), the more accurate the digital representation is of the original analog signal. Since it is typically desirable in high fidelity music to record and reproduce sound in a range generally from 20 Hz to 20 KHz, it can be appreciated that the A-D converter used in CD audio is a high quality device that samples very rapidly, e.g. 44.1 KHz. As with all binary devices, storage size is a limiting consideration. The CD disc is no exception. Given its size and packing density, it can hold only so many bits of digital data. At the sampling rate employed for high fidelity sound applications, the typical CD disc can hold about 74 minutes worth of music as a maximum. As those skilled in the art will readily recognize and appreciate, while the digital storage medium being employed herein is a Compact Disc, the same compression and decompression techniques being described herein could be used with any digital storage medium, such as digital tape. It is intended, therefore, that the breadth accorded the invention and the appended claims be in accord with the scope and spirit of the invention and not be limited in any way by the use of a particular example for convenience only.

If one is not interested in high fidelity, significantly more audio data can be put on a CD disc employing the technique of the present invention as depicted in FIG. 9. The inventor herein has found that given the tonal range of the typical voice and the portions thereof required to produce acceptable voice reproduction, the A-D converter of a typical CD player has a sampling rate which is as least four or five times more than required. Thus, if the data stored on the CD disc were representative of speech sampled say four or five times slower, the CD disc could hold four to six hours of talking. This, of course, is dependent on band width. Telephone grade (4 KHz) requires at least 8 KHz sampling which is about 5.5 times slower yielding about 6.8 hours of playback time on a CD disc. Lower quality would go even higher. It is anticipated that one could reasonably go as low as 6 KHz sampling rate which, at 7.35 times slower, would yield about 9 hours of playback time. If one were to go to say 4 KHz, the result would be understandable, but not clear. As can be appreciated, this vast increase in playback time from a single CD would be particularly useful in talking book applications, or the like. To accomplish this objective, the audio is first recorded in analog form at a first (i.e. slow) speed on a variable speed device. A variable speed tape recording device is preferred because of its convenience of use and ready availability. The digital audio signal is then recorder in its normal manner using normal equipment with the exception that the analog input is played back as an input to the CD audio recording equipment at a second speed which is faster than the first speed by the compression factor to be employed, say four times faster for a four-to-one compression ratio. The digital recording equipment, of course, samples at its normal high rate as part of the A-D conversion process; but, since the input is four times faster than normal, the sampling takes place at four times the spacing along the incoming signal. Thus, the data on the CD disc 76 is the same as if the data were input at normal speed and sampled by an A-D converter with one-fourth the sampling rate.

When played back by the system 22 employing the decompressor 72, the decompressor 72 (through its control output 74) plays a segment of data from the CD disc 76 into a buffer 78. The CD player 36 is then PAUSE'd while the contents of the buffer 78 is "played" at the original slow speed. The process is then repeated until the entire portion of the CD disc 76 which is to be played has been played. While a variable speed tape recorder or other analog means could be employed for the buffer 78, since the data from the CD disc 76 is digital in nature, it is much cheaper and more convenient to employ a digital buffer having two clock speed inputs connected thereto. Data is clocked into the buffer 78 at a clock speed (CLOCK1) which is matched to the CD player 36. Data is clocked out of the buffer 78 at a clock speed (CLOCK2) which is matched to the compression ratio. Thus, in the above example CLOCK1=4CLOCK2. In this manner, the balance of the audio portions of the CD player 36 can be employed.

When used in a talking book environment, one may wish to add several additional features to the system 22 and the decompressor 72. First, the title of the CD disc could be included as part of the audio data thereof so as to be retrievable by pressing a button or combination of buttons on the control wand (which may or may not include the optical read head). Optionally, a spoken index could be included. Thus, the visually impaired could determine the contents of a disc without having to know braille. Second, another button or combination could provide an "electronic bookmark" by storing the current position on the CD disc into the memory 58. Thus, the "reader" could return to where he/she left off with ease. Finally, one may wish to artificially reproduce and add in the overtones of the original recording voice which were lost as a result of the slow sampled A-D conversion that was employed to pack the compressed data on the CD disc 76. Such data reconstruction techniques are well known to those skilled in the audio reproduction art and the implementation thereof within the system 22 of the present invention could be accomplished easily without undue experimentation.

Figure 10:
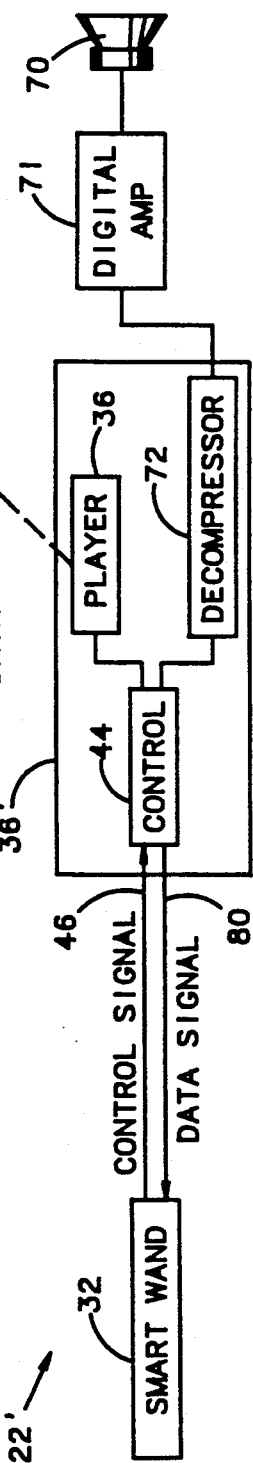
FIG. 10 is a simplified functional block diagram showing a preferred embodiment of the present invention where the recorded sounds have been compressed, the decompression circuitry is included within the CD player, and programming information relative to recorded data is contained with the data on the associated CD disc to be read by the smart wand.

Finally, as presently implemented the invention employs conventional off-the-shelf CD players. This may prove to be the best approach commerically with the custom features now to be described included partially in the smart wand 32 and partially in a "black box" decompressor 72 sold as an accessory for use with off-the-shelf CD players. Alternatively, however, the CD player could be built for specific use with the system of this invention with these additional capabilities built in. Such an approach is depicted in simplified form in FIG. 10. As depicted, the decompressor 72 is built into the CD player 36'. While not specifically shown, the digital amplifier 71 could also be included within the CD player 36', if desired. Also, a data line 80 is connected from the CD player 36' back to the smart wand 32 where it connects to the read interface 60 of FIG. 3 thus providing a feedback signal from the CD player 36' to the control logic 44. This provides considerable flexibility to the system 22' of FIG. 10. It will be remembered from the descriptions above that the CD discs 76 employed therein only contained data, that the memory 58 contained the programming for the system, and that the data on the CD discs 76 and the stickers 30 had to be coordinated. With the addition of the feedback provided by the data line 80, the system 22' can be general purpose in nature with the functioning being defined on the CD discs 76 loaded therein. As depicted in FIG. 10, the preferred CD discs 76 contain both program and sound data. Such CD discs are already used in the computer arts as program storage media; so, the use thereof for such purpose is not in and of itself novel. In fact, the CD audio standard provides for data channels along side the audio channels to be defined and used for such purposes. The novelty resides in combining the programming and sound data and having the generalized system 22' of this invention customize itself in each case as a function of the CD disc 76 which has been loaded therein. In this manner, the enhanced system 22' is a truly multi-functional system (such as personal computers and the like) which can afford benefits to many members of a family or other organization for multiple purposes.

In addition to the sound association and learning functions and the extended-play talking book applications possible with the present invention as described above, the invention is also adaptable for use to provide a more in-depth interactive environment for both learning and "audio adventure" applications. This is particularly true with a system such as the system 22' of FIG. 10 where programming data is included with each Compact Disc 76. The smart wand 32 can be employed to provide decisional inputs from the user back to the logic of the program being run. This could be through barcode scanning and/or use of the function buttons 48. As those familiar with radio before the advent of television will remember, the adventure and other types of programs supplemented by only sound effects could prove to be much more intriguing when occurring in the listener's imagination than when reduced to visual images. For example, video games require total attention of the player and are designed for action and reaction in a play environment which stimulates the player to pay a maximum amount for the continuing experience and challenge. It is a delicate balance for the designer to achieve. If the game is too simple, the player is bored and the "cashbox" is low. If it is too hard, the player gets frustrated and stops playing. Attempts to put player involvement adventure type games such as Dungeons and Dragons onto a video environment have generally proved to be less than successful because the adventure is subordinated to the action for the above-described profit reasons. The same game implemented on the present invention, on the other hand, would provide many hours of changing entertainment in a home environment once the initial Compact Disc was purchased. Each adventure with the Compact Disc would be a new one as the paths followed could be changed as a function of the player's decisions along the route. The player could take one fork in the road one time and the opposite the next resulting in completely different adventures based on that one decision alone. The player could also decide to "pick up" articles along the path or not when given the opportunity with the presence or lack thereof of given articles changing the decision paths of the adventure as well. The "electronic bookmark" described above could, of course, be employed to allow the player to pause in his/her adventure and then resume at a later time.

As applied to a human language system the interactive aspects of this invention could be used to select functions such as "translate", "define", "conjugate", "repeat", or any other aspect of language learning and use that one might ask a language tutor. In this regard, the present invention becomes the next best thing to a human language tutor in that the course of learning and use of the language can be set by the needs of the student/user.

Wherefore, having thus described my invention, what is claimed is:

1. A sound association and learning system comprising:
   a) a media having a plurality of visually recognizable indicia thereon associated with respective ones of a plurality of items to have sounds associated therewith;
   b) a plurality of scannable barcodes disposed on said media and associated with respective ones of said indicia, each of said plurality of scannable barcodes comprising a unique index indicating the one of said indicia with which it is associated;
   c) scanner means for scanning individual selected ones of said barcodes to obtain an electrical signal at an output thereof containing said unique index;
   d) a Compact Disc containing a plurality of sounds associated with respective ones of said plurality of items, each of said plurality of sounds being individually addressable by means of a said unique index associated therewith;
   e) Compact Disc player means for playing said Compact Disc to output digital data streams reflecting selected ones of said sounds; and,
   f) sound reproduction means connected to said Compact Disc player means for reproducing sounds from said digital data streams.

2. The sound association and learning system of claim 1 wherein:
   said scanner means comprises a hand-held wand having an optical scanner in a scanning end thereof.

3. The sound association and learning system of claim 2 wherein:
   a) said wand includes memory means for storing a plurality of said barcodes after individual scanning thereof; and,
   b) said wand further include selector means for manually selecting ones of said barcodes in said memory means for which the associated said sound is to be reproduced.

4. The sound association and learning system of claim 3 wherein:
   a) said selector means comprises a first manually activateable switch; and additionally comprising,
   b) logic means for sensing activation of said first manually activateable switch, for accessing said memory means, and for causing said associated said sound to be reproduced.

5. The sound association and learning system of claim 4 and additionally comprising:
   a) a second manually activateable switch; and wherein,
   b) said logic means includes means for sensing said second manually activateable switch and for storing a scanned said barcode in a next available position on a list in said memory means when said second manually activateable switch is activated.

6. The sound association and learning system of claim 4 and additionally comprising:
   a) said Compact Disc including control information thereon;

b) read interface means connected to said Compact Disc player means and said memory means for inputting digital control data from said Compact Disc into said memory means; and, c) said logic means including reprogramable logic means for executing logic sequences determined by said digital control data whereby said sound association and learning system can be a general system which is specialized by digital control data added to respective ones of a plurality of specilized Compact Discs.

7. The sound association and learning system of claim 1 wherein:
said sound reproduction means comprises an earphone to be worn by a user of the system.

8. The sound association and learning system of claim 1 wherein said sound reproduction means comprises:
a) an audio speaker; and,
b) a digital amplifier connected to drive said audio speaker.

9. The sound association and learning system of claim 8 wherein:
a) said sounds on said Compact Disc are digitized sounds created by sampling analog sounds at a first sampling rate and then storing them on said Compact Disc as if sampled at a second sampling rate which is faster than said first sampling rate; and wherein additionally,
b) said sound reproduction means includes,
  b1) digital buffer means for receiving said digital data streams from said Compact Disc player means and for outputting revised digital data streams to said digital amplifier, and
  b2) bi-stable clock means connected to said buffer means for inputting said digital data streams at said second sampling rate and for outputting said digital data streams as revised digital data streams at said first sampling rate; and additonally comprising,
c) accordion store logic means connected to a control input of said Compact Disc player means, to said buffer means and to said bi-stable clock means for pausing input from said Compact Disc player means into said buffer means if said buffer means becomes full.

10. The sound association and learning system of claim 9 wherein:
said accordion store logic means first inputs a portion of a said digital data stream into said buffer means, then pauses said Compact Disc player means, then outputs said portion from said buffer means, and then repeats the foregoing process until a full said digital data stream as selected has been output to said digital amplifier.

11. The sound association and learning system of claim 9 wherein:
a) said second sampling rate is at least five times faster than said first sampling rate; and additionally comprising,
b) means for artifically adding overtones to each said digital data stream whereby more realistic human speech is recreated from compressed data.

12. The sound association and learning system of claim 1 wherein:
a) said plurality of visually recognizable indicia comprises pictures of animals; and,
b) said sounds comprise sounds made by respective ones of said animals.

13. The sound association and learning system of claim 1 wherein:
a) said plurality of visually recognizable indicia comprises pictures of things and concepts; and,
b) said sounds comprise verbal sounds corresponding to said things and concepts in a human language.

14. The sound association and learning system of claim 1 wherein:
a) said plurality of visually recognizable indicia comprises words describing things and concepts in a first human language; and,
b) said sounds comprise verbal sounds corresponding to said things and concepts in a second human language.

15. A digital sound storage and retrieval system having extended sound storage capacity on each digital storage element comprising:
a) a digital storage element containing a plurality of sounds to be retrieved therefrom, said sounds on said digital storage element being analog sounds sampled at a first sampling rate and stored digitally on said digital storage element as if sampled at a second sampling rate which is faster than said first sampling rate;
b) digital storage element player means for playing said digital storage element to output digital data streams reflecting said sounds; and,
c) sound reproduction means connected to said digital storage element player means for reproducing sounds from said digital data streams, said sound reproduction means comprising,
  c1) an audio speaker,
  c2) a digital amplifier connected to drive said audio speaker,
  c3) digital buffer means for receiving said digital data streams from said digital storage element player means and for outputting revised digital data streams to said digital amplifier, and
  c4) bi-stable clock means connected to said buffer means for inputting said digital data streams at said second sampling rate and for outputting said digital data streams as revised digital data streams at said first sampling rate; and,
d) accordion store logic means connected to a control input of said digital storage element player means, to said buffer means and to said bi-stable clock means for pausing input from said digital storage element player means into said buffer means if said buffer means becomes full.

16. The digital storage element-based sound storage and retrieval system of claim 15 wherein:
said accordion store logic means first inputs a portion of a said digital data stream into said buffer means, then pauses said digital storage element player means, then outputs said portion from said buffer means, and then repeats the foregoing process until a full said digital data stream as selected has been output to said digital amplifier.

17. The digital storage element-based sound storage and retrieval system of claim 15 wherein:
a) said second sampling rate is at least five times faster than said first sampling rate; and additionally comprising,
b) means for artificially adding overtones to each said digital data stream whereby more realistic human speech is recreated from compressed data.

18. The digital storage element-based sound storage and retrieval system of claim 15 and additionally comprising:
   a) digital memory means;
   b) a first manually activated switch;
   c) a second manually activated switch;
   d) logic means for storing a current position on said digital storage element into said digital memory means and stopping said system when said first manually activated switch is activated and for retrieving said current position on said digital storage element from said digital memory means and starting said system at said current position on said digital storage element when said second manually activated switch is activated whereby an electronic bookmark is implemented.

19. A learning and identification support system for birders comprising:
   a) a media having a plurality of visually recognizable bird pictures thereon associated with respective ones of a plurality of birds to have birdsong associated therewith;
   b) a plurality of scannable barcodes disposed on said media and associated with respective ones of said bird pictures, each of said plurality of scannable barcodes comprising a unique index indicating the one of said bird pictures with which it is associated;
   c) scanner means for scanning individual selected ones of said barcodes to obtain an electrical signal at an output thereof containing said unique index;
   d) a Compact Disc containing a plurality of birdsongs associated with respective ones of said plurality of birds, each of said plurality of birdsongs being individually addressable by means of a said unique index associated therewith;
   e) Compact Disc player means for playing said Compact Disc to output digital data streams reflecting selected ones of said birdsongs; and,
   f) sound reproduction means connected to said Compact Disc player means for reproducing birdsongs from said digital data streams.

20. The learning and identification support system for birders of claim 19 wherein:
   said scanner means comprises a hand-held wand having an optical scanner in a scanning end thereof.

21. The learning and identification support system for birders of claim 20 wherein:
   a) said wand includes memory means for storing a plurality of said barcodes after individual scanning thereof; and,
   b) said wand further include selector means for manually selecting ones of said barcodes in said memory means for which the associated said birdsound is to be reproduced.

22. The learning and identification support system for birders of claim 21 wherein:
   a) said selector means comprises a first manually activateable switch; and additionally comprising,
   b) logic means for sensing activation of said first manually activateable switch, for accessing said memory means, and for causing said associated said birdsound to be reproduced.

23. The learning and identification support system for birders of claim 22 and additionally comprising:
   a) a second manually activateable switch; and wherein,
   b) said logic means includes means for sensing said second manually activateable switch and for storing a scanned said barcode in a next available position on a list in said memory means when said second manually activateable switch is activated.

24. The learning and identification support system for birders of claim 22 and additionally comprising:
   a) said Compact Disc including control information thereon;
   b) read interface means connected to said Compact Disc player means and said memory means for inputting digital control data from said Compact Disc into said memory means; and,
   c) said logic means including reprogramable logic means for executing logic sequences determined by said digital control data whereby said learning and identification support system for birders can be a general system which is specialized by digital control data added to respective ones of a plurality of specialized Compact Discs.

25. An interactive audio system for performing interactive applications programs comprising:
   a) a Compact Disc containing a plurality of soundtracks, each of said plurality of soundtracks containing sounds associated with an applications program and being individually addressable by means of a unique index associated therewith, said Compact Disc further including applications program control information thereon;
   b) Compact Disc player means for playing said Compact Disc to output digital data streams reflecting selected ones of said soundtracks;
   c) sound reproduction means connected to said Compact Disc player means for reproducing selected one of said soundtracks from said digital data streams;
   d) memory means for receiving and holding applications program control information;
   e) read interface means connected to said Compact Disc player means and said memory means for inputting digital applications program control information from said Compact Disc into said memory means;
   f) user selection input means for allowing a user to indicate selections of options contained within an applications program; and,
   g) logic means for sensing selections of options by a user through said user selection input means, for accessing said memory means, and for selecting and causing a said associated said soundtrack to be reproduced, said logic means including reprogramming logic means for executing logic sequences determined by said applications program control information in said memory means whereby the interactive audio system can be a general system which is specialized by digital applications program control information added to respective ones of a plurality of specialized Compact Discs.

26. The interactive audio system of claim 25 and additionally comprising:
   a) a media having a plurality of visually recognizable applications option pictures thereon associated with respective ones of a plurality of options to an applications program; and,
   b) a plurality of scannable barcodes disposed on said media and associated with respective ones of said pictures, each of said plurality of scannable barcodes comprising a unique index indicating the one of said pictures with which it is associated; and wherein, c) said user selection input means includes scanner means for scanning individual selected ones of said barcodes to obtain an electrical signal at an output thereof containing said unique index.

27. The interactive audio system of claim 25 wherein: said user selection input means includes a plurality of switches for manual activation by a user to indicate the selection of options.

* * * * *